US008856623B1

(12) United States Patent
Amdahl

(10) Patent No.: US 8,856,623 B1
(45) Date of Patent: Oct. 7, 2014

(54) METHODS FOR IMPLEMENTING ADAPTIVE FORWARD ERROR CORRECTION AND SYSTEMS THEREOF

(75) Inventor: Saxon Amdahl, Mountain View, CA (US)

(73) Assignee: F5 Networks, Inc., Seattle, WA (US)

( * ) Notice: Subject to any disclaimer, the term of this patent is extended or adjusted under 35 U.S.C. 154(b) by 811 days.

(21) Appl. No.: 12/648,858

(22) Filed: Dec. 29, 2009

(51) Int. Cl.
*G06F 11/00* (2006.01)

(52) U.S. Cl.
USPC .......................................... 714/774; 714/751

(58) Field of Classification Search
CPC ... H04L 43/0823; H04L 1/0002; H04W 4/20; H04W 28/18; H04W 16/18; H04W 40/04; H04W 40/08; H04W 40/14; H04W 40/16; H04W 40/20; H04W 40/30; H04W 84/18; H04W 84/22; H04W 88/02; H04W 28/24; H04W 28/26; H04W 4/24; H04W 52/20
USPC .................................................. 714/751, 774
See application file for complete search history.

(56) References Cited

U.S. PATENT DOCUMENTS

| | | | | |
|---|---|---|---|---|
| 6,697,984 | B1 * | 2/2004 | Sim et al. | 714/751 |
| 6,807,648 | B1 * | 10/2004 | Cansever et al. | 714/776 |
| 6,915,477 | B2 * | 7/2005 | Gollamudi et al. | 714/774 |
| 7,174,493 | B2 * | 2/2007 | Matsumoto et al. | 714/748 |
| 7,958,435 | B2 * | 6/2011 | Kure et al. | 714/776 |
| 8,015,474 | B2 * | 9/2011 | Izzat et al. | 714/774 |
| 8,060,017 | B2 * | 11/2011 | Schlicht et al. | 455/41.2 |
| 2007/0079222 | A1 * | 4/2007 | Kure et al. | 714/776 |
| 2008/0134005 | A1 * | 6/2008 | Izzat et al. | 714/774 |
| 2009/0310493 | A1 * | 12/2009 | Nogami | 370/252 |

* cited by examiner

*Primary Examiner* — Bryce Bonzo
*Assistant Examiner* — Elmira Mehrmanesh
(74) *Attorney, Agent, or Firm* — LeClairRyan, a Professional Corporation

(57) ABSTRACT

A method, computer readable medium, and system for implementing adaptive forward error correction in a network includes converting at a first computing device a number K of original data packets into a number N of error correction packets for forward error correction for a transmission to a second computing device. A subset number S1 of the number N of the error correction packets which is less than the number N of error correction packets is determined at the first computing device based on a loss rate for the transmission to the second computing device. The determined subset number S1 of the number N of the error correction packets is transmitted from the first computing device to the second computing device.

24 Claims, 4 Drawing Sheets

METHODS FOR IMPLEMENTING ADAPTIVE FORWARD ERROR CORRECTION AND SYSTEMS THEREOF

FIELD

This technology generally relates to error control for data transmissions and, more particularly, to methods for implementing adaptive forward error correction in a network and systems thereof.

BACKGROUND

With data transmissions, data packets can be lost or corrupted in transmissions requiring retransmission of the lost or corrupted data packets. Although in most instances the lost or corrupted data packets can be retransmitted, substantial amounts of time are required to recognize the error, request retransmission, and then hopefully to receive the lost or corrupted data packets.

Forward error correction was introduced to address the additional time required for the recognition, request, and retransmission of lost or corrupted packets. With forward error correction, the sender sends redundant data spread across multiple packets so that the receiver only needs to receive a portion of the originally transmitted packets to reconstruct the data transmission.

With this technique, a number of original data packets and a number of error correction packets are set by an operator. The particular setting can involve a range of a large number of error correction packets to original data packets which carries a low loss rate, but high transmission overhead to a low number of error correction packets which carries a high loss rate, but low transmission rate. Unfortunately, neither end of this range is a desirable long term solution.

SUMMARY

A method for implementing adaptive forward error correction includes converting at a first computing device a number K of original data packets into a number N of error correction packets for forward error correction for a transmission to a second computing device. A subset number S1 of the number N of the error correction packets which is less than the number N of error correction packets is determined at the first computing device based on a loss rate for the transmission to the second computing device. The determined subset number S1 of the number N of the error correction packets is transmitted from the first computing device to the second computing device.

A computer readable medium having stored thereon instructions for implementing adaptive forward error correction in a network comprising machine executable code which when executed by at least one processor, causes the processor to perform steps including converting a number K of original data packets into a number N of error correction packets for forward error correction for a transmission. A subset number S1 of the number N of the error correction packets which is less than the number N of error correction packets is determined based on a loss rate for the transmission. The determined subset number S1 of the number N of the error correction packets is used in the transmission.

An adaptive forward error correction system includes an error correction processing system and a communication system at a first computing device. The error correction processing system converts a number K of original data packets into a number N of error correction packets for forward error correction for a transmission to a second computing device. The error correction processing system also determines a subset number S1 of the number N of the error correction packets which is less than the number N of error correction packets based on a loss rate for the transmission to the second computing device. The communication system transmits from the first computing device to the second computing device the determined subset number S1 of the number N of the error correction packets.

This technology provides a faster and more effective forward error correction method and apparatus. With this technology, forward error correction can be adaptively adjusted to the particular transmission and even to the particular direction of the transmission without requiring recalculation of the K and N forward error correction values. Leaving the K and N forward error correction values static, while adjusting the subset number of error correction packets enables the implementation of a substantially more efficient forward correction process. As a result, this technology provides an effective balance of loss resistance and overhead for each particular transmission scenario.

DETAILED DESCRIPTION

Figure 1:
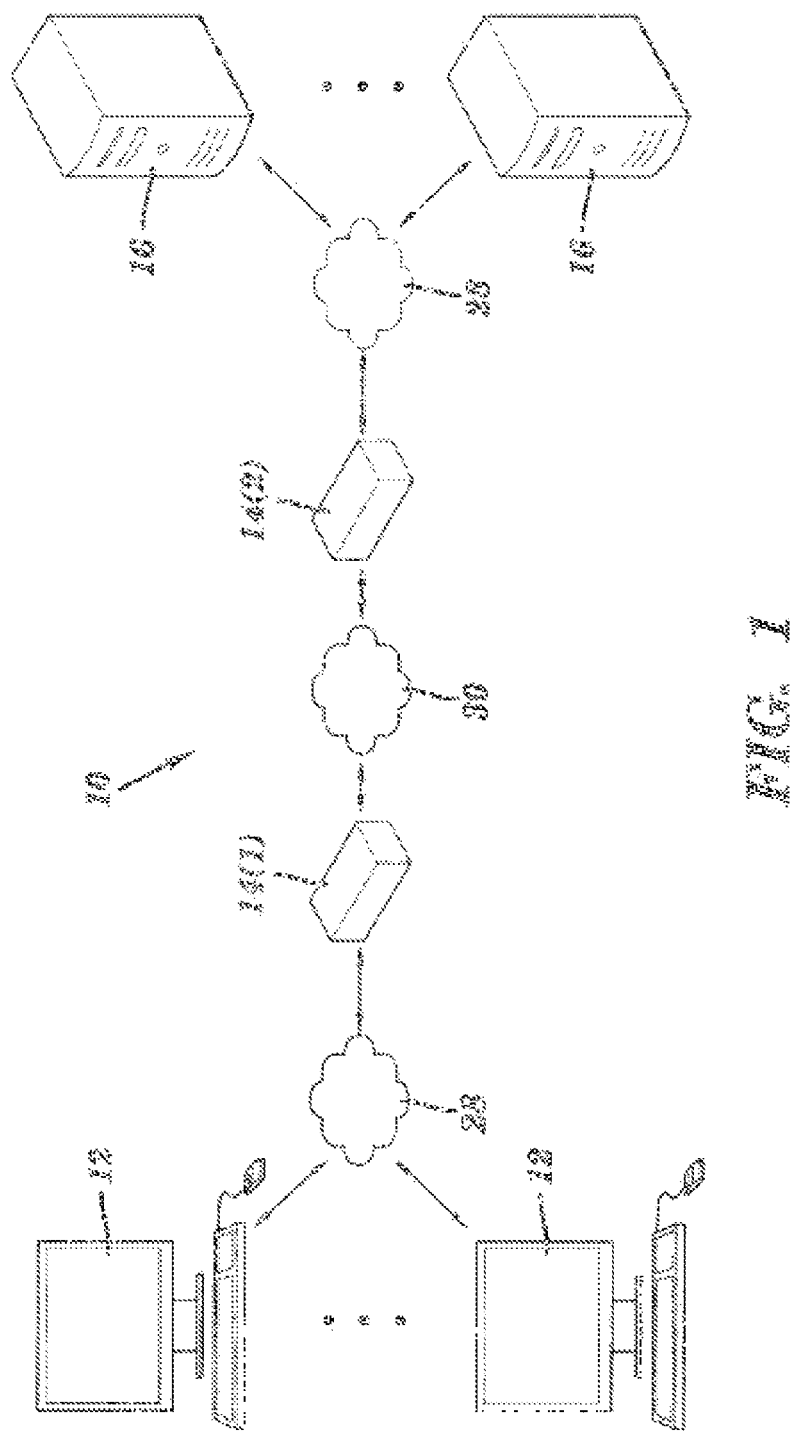
FIG. 1 is a block diagram of a network environment which incorporates an adaptive forward error correction system.
Figure 2:
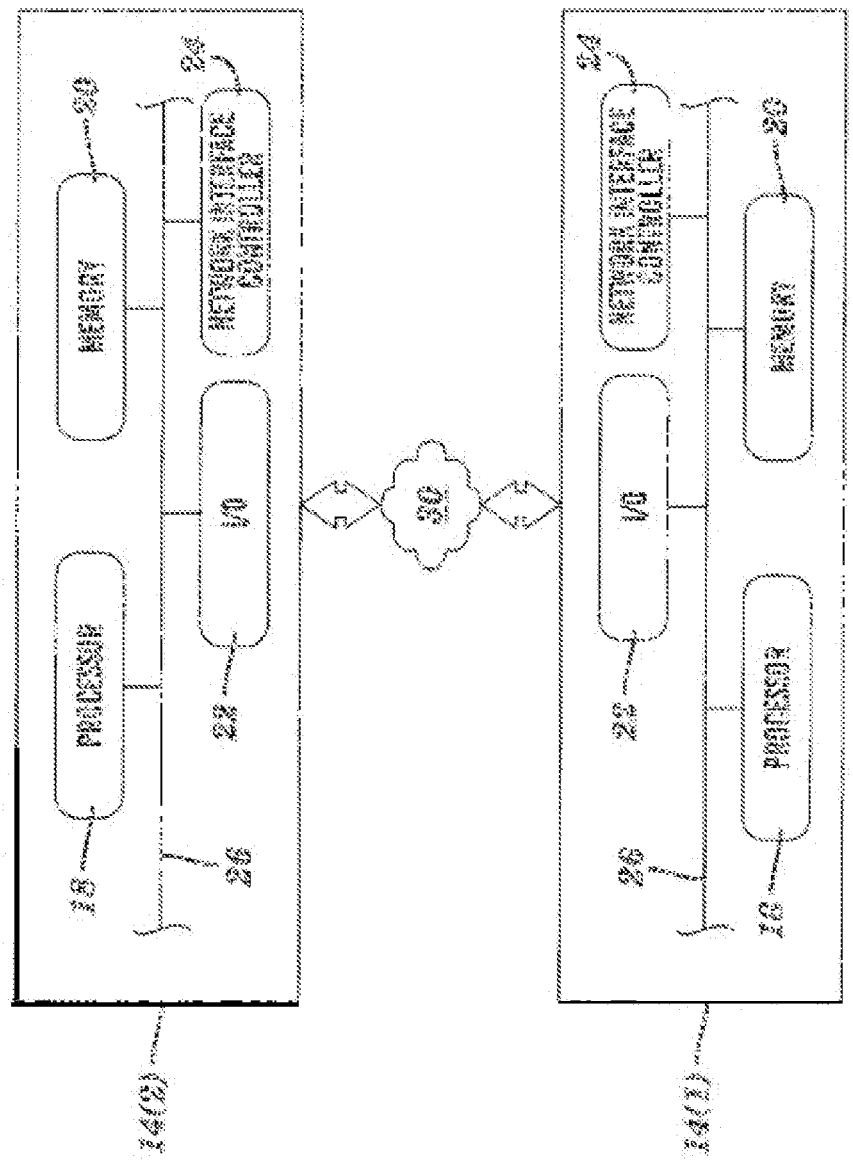
FIG. 2 is a block diagram of network traffic management devices in the network environment shown in FIG. 1.

An exemplary network environment 10 which incorporates an adaptive forward error correction system is illustrated in FIGS. 1 and 2. This exemplary network environment 10 includes client computing devices 12, traffic management devices 14(1) and 14(2) in a symmetric deployment, and servers 16 which are coupled together by local area networks (LAN) 28 and wide are network (WAN) 30, although other types and numbers of devices and components in other topologies could be used. While not shown, the system 10 may include additional network components, such as routers, switches and other devices.

More specifically, traffic management device 14(1) is coupled to client computing devices 12 through one of the LANs 28, although the client computing devices 12 or other devices and traffic management device 14(1) may be coupled together via other topologies. Additionally, the traffic management device 14(2) is coupled to the servers 16 through another one of the LANs 28, although the servers 16 or other devices and traffic management device 14(2) may be coupled together via other topologies. LANs 28 each may employ any suitable interface mechanisms and communications technologies including, for example, telecommunications in any suitable form (e.g., voice, modem, and the like), Public Switched Telephone Network (PSTNs), Ethernet-based Packet Data Networks (PDNs), combinations thereof, and the like. The traffic management device 14(1) is coupled to the traffic management device 14(2) through the WAN 30, which may comprise any wide area network (e.g., Internet), although any other type of communication network topology may be used. Various network processing applications, such as CIFS applications, NFS applications, HTTP Web Server applications, FTP applications, may be operating on servers 16 and transmitting data (e.g., files, Web pages) through the traffic management devices 14(1) and 14(2) in response to requests from client computing devices 12.

In this example, the traffic management devices 14(1) and 14(2) run one or more traffic management applications on one or more processors 18 to manage network traffic by optimizing, securing and accelerating the traffic between client computing devices 12 and servers 16 including implementing adaptive forward error correction, although traffic management devices 14(1) and 14(2) may perform other network related functions. Moreover, the network traffic may be received and transmitted by traffic management devices 14(1) and 14(2) from and to the LANs 28 and WAN 30 in the form of network data packets in the TCP/IP protocol, although the network data packets could be in other network protocols.

Traffic management devices 14(1) and 14(2) each include processor(s) 18, memory 20, interface(s) 22, and network interface controller (NIC) 24, which are coupled together by bus 26, although each may comprise other types and numbers of elements in other configurations. Although the traffic management devices 14(1) and 14(2) are shown in FIG. 1 in this example as being standalone devices, such as a BIG-IP® traffic management device offered by F5 Networks, Inc., of Seattle, Wash., it should be appreciated that the traffic management devices 14(1) and 14(2) could also be one of several blades servers coupled to a chassis device, such as a VIPRION® traffic management device, also offered by F5 Networks, Inc., of Seattle, Wash.

Processor(s) 18 execute the traffic management applications that handle the network traffic between applications on the client computing devices 12 and servers 16 as well as one or more computer-executable instructions stored in the memory 20 and other operations illustrated and described herein. The processor(s) 18 may comprise one or more central processing units ("CPUs") or general purpose processors with one or more processing cores, such as AMD® processor(s), although other types of processor(s) could be used (e.g., Intel®).

Figure 3:
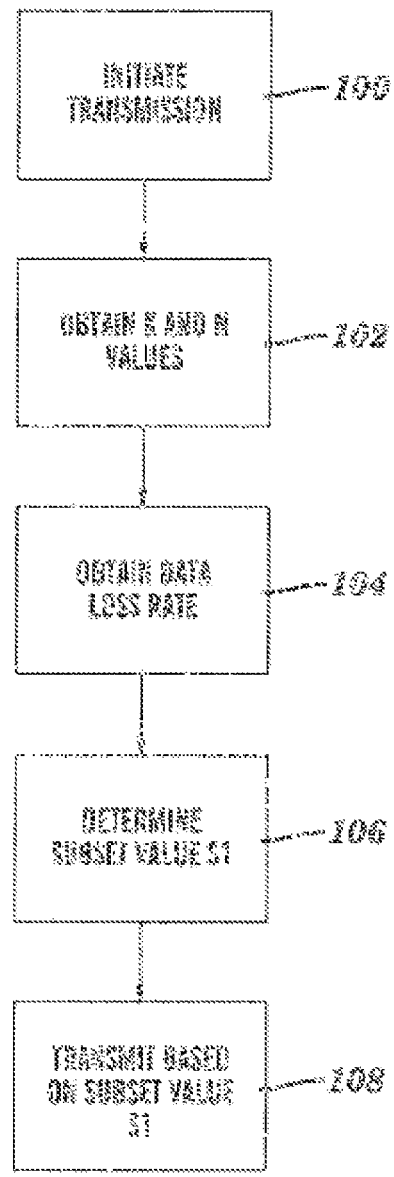
FIG. 3 is a flowchart of a method for implementing adaptive forward error correction at a transmitter.
Figure 4:
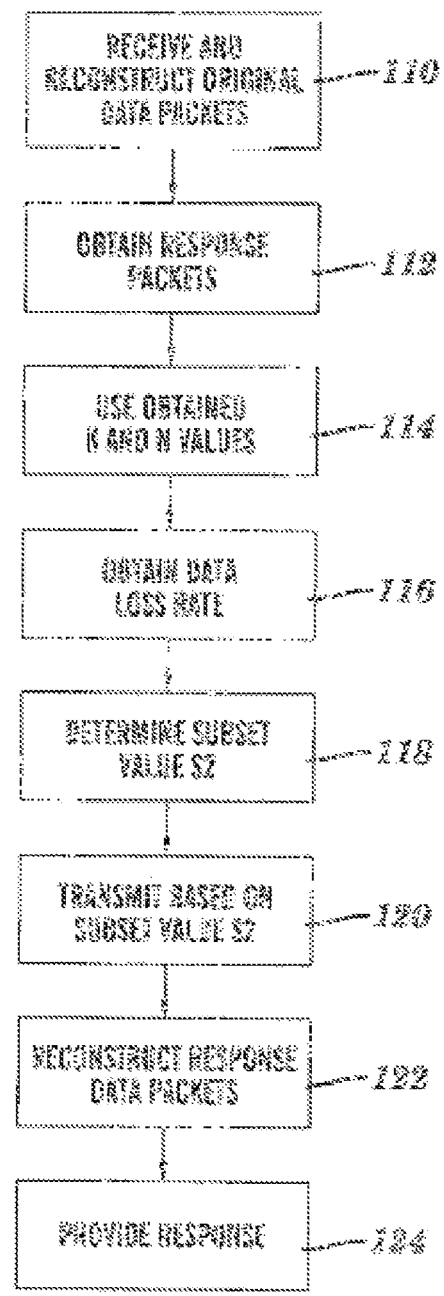
FIG. 4 a flowchart of a method for implementing adaptive forward error correction at a receiver.

Memory 20 may comprise one or more tangible storage media such as, for example, RAM, ROM, flash memory, CD-ROM, floppy disk, hard disk drive(s), solid state memory, DVD, or any other memory storage type or devices, including combinations thereof, which are known to those of ordinary skill in the art. Memory 20 may store one or more computer-readable instructions that may be executed by the one or more processor(s) 18 and/or the NIC 24. When these stored instructions are executed, they may implement processes that are illustrated, for exemplary purposes only, by the flow chart diagrams shown in FIGS. 3 and 4. It should be appreciated the flow chart diagrams shown in FIGS. 3 and 4 are representative of example steps or actions that may be embodied or expressed as one or more computer or machine readable instructions or logic that may be executed by the processor(s) 18 and/or NICs 24 in traffic management devices 14(1) and 14(2) shown in FIGS. 1 and 2. In this example, the machine readable instructions may embody an algorithm or computer program for execution by at least one of: (a) one or more processors each having one or more processor cores, (b) hardware specifically configured to perform the instructions (e.g., ASICs, FPGAs) and (c) one or more other suitable processing device(s). The algorithm or computer program may be embodied in software stored on memory 20, for example.

NIC 24 may comprise specialized hardware to achieve maximum execution speeds, such a field programmable gate arrays ("FPGAs"), although other hardware and/or software may be used, such as ASICs, field programmable logic devices ("FPLDs"), programmable logic units ("PLUs"), software executed by the processor 18, and combinations thereof. The use of the specialized hardware in this example, however allows the NIC 24 and/or the processor 18 executing programmed instructions stored in memory 20 to efficiently assist with the transmission and receipt of data packets via WAN 30 and the LANs 28 and implement adaptive forward error correction, as illustrated and described herein. It is to be understood that NIC 24 may take the form of a network peripheral card or other logic that is installed inside a bus interface within traffic management devices 14(1) and 14(2) or may be an embedded component as part of a computer processor motherboard, a router or printer interface, or a USB device that may be internal or external to the traffic management devices 14(1) and 14(2).

Input/output interfaces 22 include one or more keyboard/mouse interfaces, display devices interfaces, and other physical and/or logical mechanisms for enabling traffic management devices 14(1) and 14(2) to communicate with the outside environment, which includes WAN 30, LANs 28 and users (e.g., administrators) desiring to interact with traffic management devices 14(1) and 14(2), such as to configure, program or operate it. The bus 26 is a hyper-transport bus in this example, although other bus types may be used, such as PCI.

Each of the client computing devices 12 and servers 16 include a central processing unit (CPU) or processor, a memory, and an interface or I/O system, which are coupled together by a bus or other link, although other numbers and types of network devices could be used. The client computing devices 12, in this example, may run interface applications, such as Web browsers, that may provide an interface to make requests for and send data to different server based applications via the LANs 28 and WAN 30. Generally, servers 16 process requests received from requesting client computing devices 12 via LANs 28 and WAN 30 according to the HTTP-based application RFC protocol or the CIFS or NFS protocol in this example, but the principles discussed herein are not limited to this example and can include other application protocols. A series of applications may run on the servers 16 that allow the transmission of data, such as a data file or metadata, requested by the client computing devices 12. The servers 16 may provide data or receive data in response to requests directed toward the respective applications on the servers 16 from the client computing devices 12. As per TCP, packets may be sent to the servers 16 from the requesting client computing devices 12 to send data. It is to be understood that the servers 16 may be hardware or software or may represent a system with multiple servers 16, which may include internal or external networks. In this example the servers 16 may be any version of Microsoft® IIS servers or Apache® servers, although other types of servers may be used. Further, additional servers may be coupled to the LAN 28 and many different types of applications may be available on servers coupled to the LAN 28.

Although an exemplary network environment 10 with client computing devices 12, traffic management devices 14(1) and 14(2), servers 16, LANs 28 and WAN 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any example. Accordingly, principles and advantages of distributed processing, such as redundancy and replication also can be implemented, as desired, to increase the robustness and performance of the devices and systems of the examples. The examples may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples may also be embodied as a computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An exemplary method for implementing adaptive forward error correction at a transmitter will now be described with reference to FIGS. 1-3. In this particular example, the data communications are initiated by and between one of the client computing devices 12 and one of the servers 16 with the implementation of the adaptive forward error correction between the network traffic management devices 14(1) and 14(2) over WAN 30, although this method can be implemented at other locations over other networks and between other types of systems, devices, and components.

In step 100, one of the client computing devices 12 initiates transmission of original data packets to one of the servers 16. In this example, the transmission of the original data packets from one of the client computing devices 12 is received by the network traffic management device 14(1) that manages traffic for this client computing device 12, although the transmission could be sent to other types and numbers of systems, devices, and components.

In step 102, during initialization the network traffic management device 14(1) determines a number N of error correction packets for a number K of original data packets to use for transmissions between the network traffic management device 14(1) and the network traffic management device 14(2). When determining or otherwise obtaining values for K and N the network traffic management device 14(1) may consider one or more factors, such as the encoding overhead, the introduction of jitter, and the ability to correct network errors, although other types and numbers of factors may be taken into account. Increasing N relative to K increases the chance of recovering from a loss at the cost of encoding overhead. Increasing K allows greater control over the N:K ratio at the cost of jitter at the receiver. In dynamic network environments, such as the exemplary one shown in FIG. 1, the N value selected must be large enough to allow error recovery at the highest anticipated loss rate for the WAN 30. In this example, the network traffic management device 14(1) may also use a Reed-Solomon error correction process to determine a number N of error correction packets for a number K of original data packets, although again other manners for obtaining the K and N values as well as other devices for making this determination or selection could be used.

In step 104, the network traffic management device 14(2) monitors a data loss rate over the WAN 30 for transmissions from the network traffic management device 14(1) to the network traffic management device 14(2) to determine a current data loss rate in this direction, although other manners for obtaining the data loss rate can be used. The network traffic management device 14(2) sends and the traffic management device 14(1) receives that measured loss rate. Likewise, the network traffic management device 14(1) monitors a data loss rate over the WAN 30 for transmissions from the network traffic management device 14(2) to the network traffic management device 14(1) to determine a current data loss rate in this direction, although other manners for obtaining the data loss rate can be used. The network traffic management device 14(1) sends that measured loss rate to the network traffic management device 14(2). The loss rate in each direction can be different.

In step 106, during runtime the network traffic management device 14(1) determines a subset number S1 of the number N of error correction packets, while leaving the determined number K of original data packets for the number N of error correction packets static. The network traffic management device 14(1) determines this subset number S1 of the number N of error correction packets by comparing the measured loss rate obtained from the network traffic management device 14(2) to a desired loss rate stored in the network traffic management device 14(1). If the measured loss rate is greater than the desired loss rate, then in this example this subset number S1 of the number N of error correction packets is increased. If the measured loss rate obtained from the network traffic management device 14(2) is significantly lower than the desired loss rate stored in the network traffic management device 14(1), then in this example this subset number S1 of the number N of error correction packets is decreased. Other types and numbers of factors may also be used to determine the subset number S1 of the number N of error correction packets. For example, if a Quality of Service (QoS) mechanism is present in the network interface controller 24 in the network traffic management device 14(1), then the QoS queue depth can be evaluated and compared against a desired QoS queue depth to increase or decrease the subset number S1 of the number N of error correction packets. In another example, the network traffic management device 14(1) may obtain the network round-trip transit (RTT) for transmissions between the network traffic management device 14(1) and the network traffic management device 14(2) and compare that against a stored threshold to either increase or decrease the subset number S1 of the number N of error correction packets. To improve efficiency, the subset number S1 of the number N of the error correction packets is less than the number N of error correction packets.

In step 108, the network traffic management device 14(1) transmits the determined subset number S1 of the error correction packets to the network traffic management device 14(2). The network traffic management device 14(1) ignores any of the number N of error correction packets which are not needed to transmit the determined subset number S1 of the error correction packets.

An exemplary method for implementing adaptive forward error correction at a receiver will now be described with reference to FIGS. 1-2 and 4. In step 110, the network traffic management device 14(2) receives the transmitted subset number S1 of the error correction packets from the network traffic management device 14(1), although the transmission could be between other network entities. The network traffic management device 14(2) reconstructs the number K of original data packets based on the received the transmitted subset number S1 of the error correction packets.

In step 112, the network traffic management device 14(2) transmits the reconstructed number K of original data packets to the designated one of the servers 16, although the data packets could be transmitted to other network entities. The network traffic management device 14(2) also may transmit the measured data loss rate for the transmission back to the network traffic management device 14(1) as described in greater detail earlier in step 104.

In this particular example, the designated server 16 may initiate a transmission of response data packets back to the requesting one of the client computing devices 12. The process for implementing adaptive forward error correction in this direction is the same as illustrated and described above with reference to FIG. 3, except as illustrated and described herein.

In step 114, the network traffic management device 14(2) uses the previously determined number N of error correction packets for number K of original data packets obtained from the network traffic management device 14(1) for this responding transmission, although other manners for obtaining the K and N values could be used.

In step 116, the network traffic management device 14(2) uses the data loss rate for transmission over the WAN 30 obtained from the network traffic management device 14(1) as described in greater detail earlier in step 104 in FIG. 3. The data loss rate for a transmission from the network traffic management device 14(2) to the network traffic management device 14(1) over WAN 30 may differ from the data loss rate for a transmission from the network traffic management device 14(1) to the network traffic management device 14(2) over WAN 30.

In step 118, the network traffic management device 14(2) determines a subset number S2 of the number N of error correction packets based on the obtained loss rate for the reverse transmission without recalculating the number K of original data packets or the number N of error correction packets for each transmission, although other manners for determining the subset number can be used. The process for determining the subset number S2 of the number N of the error correction packets is the same as described earlier in step 106 in FIG. 3.

In step 120, the network traffic management device 14(2) transmits the determined subset number S2 of the error correction packets to the network traffic management device 14(1). The network traffic management device 14(2) ignores any of the number N of error correction packets which are not needed to transmit the determined subset number S2 of the error correction packets.

In step 122, the network traffic management device 14(1) receives the transmitted subset number S2 of the error correction packets from the network traffic management device 14(2), although the transmission could be between other network entities. The network traffic management device 14(1) reconstructs the number K of response data packets based on the received the transmitted subset number S2 of the error correction packets. The network traffic management device 14(1) may also transmit the measured data loss rate for the transmission back to the network traffic management device 14(2) as described in greater detail earlier in step 104. In step 124, the network traffic management device 14(1) provides the reconstructed number K of response data packets to the designated one of the client computing devices 12 engaged in this communication.

Accordingly, as described herein this technology provides a faster and more effective forward error correction system and method. With this technology, the forward error correction can be adaptively adjusted to the particular transmission and even to the particular direction of the transmission. As a result, this technology provides an effective balance of loss resistance and overhead for each particular transmission scenario.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for implementing adaptive forward error correction in a network, the method comprising:
    converting at a first computing device a number K of original data packets into a number N of error correction packets for forward error correction for a transmission to a second computing device;
    determining at the first computing device a subset number S1 of the number N of the error correction packets which is less than the number N of error correction packets based on a loss rate for the transmission to the second computing device and a quality of service queue depth; and
    transmitting from the first computing device to the second computing device the determined subset number S1 of the number N of the error correction packets.

2. The method as set forth in claim 1 further comprising determining at the first computing device the number K of data packets and the number N of error correction packets for the forward error correction.

3. The method as set forth in claim 1 further comprising obtaining at the first computing device the loss rate for the transmission from the second computing device.

4. The method as set forth in claim 1 wherein the number K of original data packets are capable of being reconstructed from the transmitted subset number S1 of the number N of the error correction packets.

5. The method as set forth in claim 1 further comprising receiving another subset number S2 of the number N of other error correction packets from the number K of other original data packets at the first computing device from the second computing device, wherein the another subset number S2 of the number N of other error correction packets is based on another loss rate for a transmission received at the second computing device from the first computing device.

6. The method as set forth in claim 5 further comprising reconstructing at the first computing device the number K of other original data packets from the transmitted subset number S2 of the number N of the other error correction packets.

7. The method as set forth in claim 5 wherein the subset number S1 of the number N of error correction packets differs in number from the another subset S2 of the other number N of error correction packets.

8. The method as set forth in claim 1 wherein the determining at the first computing device the subset number S1 is further based on a round-trip time of a transmission.

9. A non-transitory computer readable medium having stored thereon instructions for implementing adaptive forward error correction in a network comprising machine executable code which when executed by at least one processor, causes the processor to perform steps comprising:

converting at a first computing device a number K of original data packets into a number N of error correction packets for forward error correction for a transmission to a second computing device;

determining at the first computing device a subset number S1 of the number N of the error correction packets which is less than the number N of error correction packets based on a loss rate for the transmission to the second computing device and a quality of service queue depth; and transmitting from the first computing device to the second computing device the determined subset number S1 of the number N of the error correction packets.

10. The medium as set forth in claim 9 further comprising determining at the first computing device the number K of data packets and the number N of error correction packets for the forward error correction.

11. The medium as set forth in claim 9 further comprising obtaining at the first computing device the loss rate for the transmission from the second computing device.

12. The medium as set forth in claim 9 wherein the number K of original data packets are capable of being reconstructed from the transmitted subset number S1 of the number N of the error correction packets.

13. The medium as set forth in claim 9 further comprising receiving another subset number S2 of the number N of other error correction packets from the number K of other original data packets at the first computing device from the second computing device, wherein the another subset number S2 of the number N of other error correction packets is based on another loss rate for a transmission received at the second computing device from the first computing device.

14. The medium as set forth in claim 13 further comprising reconstructing at the first computing device the number K of other original data packets from the transmitted subset number S2 of the number N of the other error correction packets.

15. The medium as set forth in claim 13 wherein the subset number S1 of the number N of error correction packets differs in number from the another subset S2 of the other number N of error correction packets.

16. The medium as set forth in claim 9 wherein the determining at the first computing device the subset number S1 is further based on a round-trip time of a transmission.

17. An adaptive forward error correction apparatus comprising:

one or more processors;

a memory coupled to the one or more processors;

a network interface unit coupled to the one or more processors and the memory via at least one bus, at least one of the network interface unit configured to implement and the one or more processors configured to execute programmed instructions stored in the memory comprising:

converting at a first computing device a number K of original data packets into a number N of error correction packets for forward error correction for a transmission to a second computing device;

determining at the first computing device a subset number S1 of the number N of the error correction packets which is less than the number N of error correction packets based on a loss rate for the transmission to the second computing device and a quality of service queue depth; and transmitting from the first computing device to the second computing device the determined subset number S1 of the number N of the error correction packets.

18. The apparatus as set forth in claim 17 wherein at least one of the network interface unit is further configured to implement and the one or more processors is further configured to execute programmed instructions stored in the memory comprising determining at the first computing device the number K of data packets and the number N of error correction packets for the forward error correction.

19. The apparatus as set forth in claim 17 wherein at least one of the network interface unit is further configured to implement and the one or more processors is further configured to execute programmed instructions stored in the memory comprising obtaining at the first computing device the loss rate for the transmission from the second computing device.

20. The apparatus as set forth in claim 17 wherein the number K of original data packets are capable of being reconstructed from the transmitted subset number S1 of the number N of the error correction packets.

21. The apparatus as set forth in claim 17 wherein at least one of the network interface unit is further configured to implement and the one or more processors is further configured to execute programmed instructions stored in the memory comprising:

receiving another subset number S2 of the number N of other error correction packets from the number K of other original data packets at the first computing device from the second computing device;

wherein the another subset number S2 of the number N of other error correction packets is based on another loss rate for a transmission received at the second computing device from the first computing device.

22. The apparatus as set forth in claim 21 wherein at least one of the network interface unit is further configured to implement and the one or more processors is further configured to execute programmed instructions stored in the memory comprising reconstructing at the first computing device the number K of other original data packets from the transmitted subset number S2 of the number N of the other error correction packets.

23. The apparatus as set forth in claim 21 wherein the subset number S1 of the number N of error correction packets differs in number from the another subset S2 of the other number N of error correction packets.

24. The apparatus as set forth in claim 17 wherein the determining at the first computing device the subset number S1 is further based on a round-trip time of a transmission.

* * * * *